United States Patent [19]
DuBost

[11] Patent Number: 4,995,673
[45] Date of Patent: Feb. 26, 1991

[54] ORNAMENTAL WHEEL HUB CAP

[75] Inventor: Dominique DuBost, La Celle Saint Cloud, France

[73] Assignee: Rapid S.A., Paris, France

[21] Appl. No.: 415,664

[22] Filed: Oct. 2, 1989

[30] Foreign Application Priority Data

Oct. 24, 1988 [FR] France ................. 88 13895

[51] Int. Cl.⁵ ............................................. B60B 7/06
[52] U.S. Cl. ............................. 301/37 P; 301/37 PB
[58] Field of Search ............... 301/37 R, 37 P, 37 TP, 301/37 PB, 108 R, 108 A, 37 H

[56] References Cited

U.S. PATENT DOCUMENTS 3,172,533  3/1965  Wright ................... 206/59

FOREIGN PATENT DOCUMENTS 0109939  5/1984  European Pat. Off. .
0271038  6/1988  European Pat. Off. .......... 301/37 P
0271381  6/1988  European Pat. Off. .
1805835  6/1969  Fed. Rep. of Germany .
3743301  7/1989  Fed. Rep. of Germany .... 301/37 R Primary Examiner—Russell D. Stormer
Attorney, Agent, or Firm—Kenyon & Kenyon

[57] ABSTRACT

An ornamental wheel hub cap to be secured onto a vehicle wheel rim through a resiliently deformable ring split to form two free ends connected by a spring-like wire allowing the radial deformation of the ring whereas a strap may removably mounted between both free ends to exert a prestress onto the ring against the force exerted by the spring wire.

4 Claims, 1 Drawing Sheet

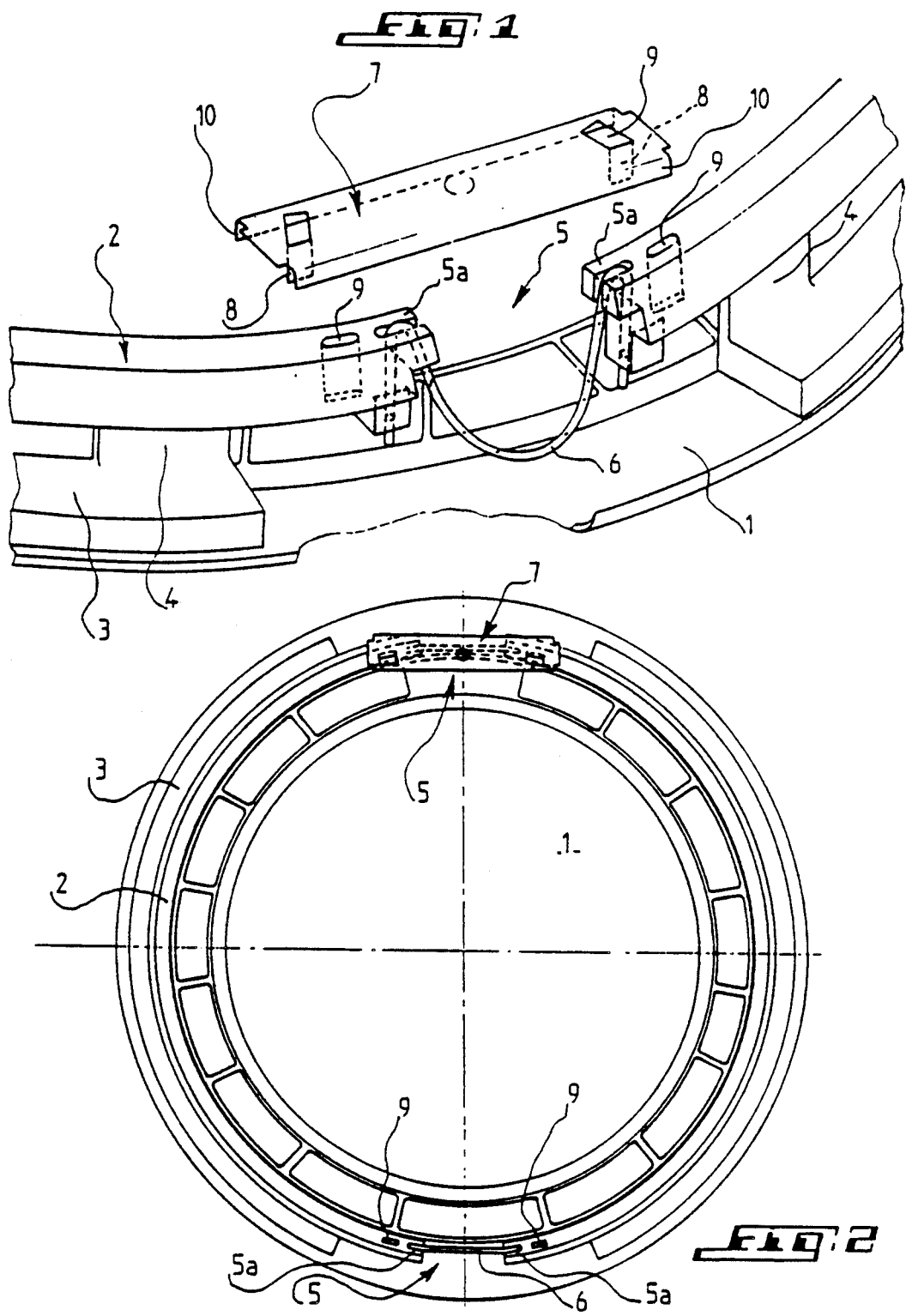

ORNAMENTAL WHEEL HUB CAP

BACKGROUND OF THE INVENTION

The present invention relates essentially to an improved ornamental wheel hub cap.

There is already known from the French patent application publication No. 2,606,710 an ornamental wheel hub cap likely to be removably secured within a step of the rim or felloe of a wheel of a vehicle through the agency of a resiliently deformable ring clipped into said step and discontinued to form two free ends connected by a resiliently deformable means such for instance as a wire allowing the radial deformation of the ring and its easy clipping into the stepped portion of the wheel rim or felloe.

It has been found however that the permanent radial deformation of the rim under the effect of the wire forming somewhat of a spring would alter with time the qualities of the rim and of the ornamental hub cap associated therewith so that the strength of the detachable mounting of the ornamental hub cap onto the wheel through the medium of the rim is far from being fully satisfactory.

SUMMARY OF THE INVENTION

Therefore the object of the present invention is to cope with this inconvenience by providing an ornamental wheel hub cap which may be mounted safely and reliably onto a wheel rim while retaining its qualities of removability.

For this purpose the invention has for its subject matter an ornamental wheel hub cap adapted to be removably secured within a stepped portion of the wheel rim of a vehicle through the agency of a resiliently deformable ring clipped into said stepped portion and discontinued or split to form at least two free ends connected by at least one resiliently deformable means such for instance as a wire allowing the radial deformation of said ring, characterized by a strap removably mounted between both aforesaid free ends and exerting a prestress upon the ring against the force exerted by said resiliently deformable means.

An advantage of the present invention is that the deformation of the whole rim cap-rim assembly before mounting onto the wheel rim is avoided, it being understood that the mounting of such an assembly through clipping onto the wheel rim is carried out after removal of the strap (s).

According to another characterizing feature of the invention, said strap comprises two upstanding lugs made for instance through cutting into the strap and co-operating with holes provided in both aforesaid free ends, respectively.

It should further be specified that the strap comprises two turned-down or flanged edges giving it a U-shaped cross-section allowing in particular the setting or fitting of the rim into the strap.

The rim is adavantageously disconstinued or split at two locations substantially positioned along its diameter and it may therefore be provided with two straps.

BRIEF DESCRIPTION OF THE DRAWINGS.

The invention will be better understood and further objects, characterizing features, details and advantages thereof will appear more clearly as the following explanatory description proceeds with reference to the accompanying diagrammatic drawings given by way of non limiting example only illustrating a presently preferred specific embodiment of the invention and wherein:

FIG. 1 is a partial perspective view of an ornamental wheel hub cap according to this invention, the strap having been omitted; and FIG. 2 is a bottom plan view of this ornamental cap.

DETAILED DESCRIPTION

Referring to FIGS. 1 and 2 there is shown an ornamental wheel hub cap which consists essentially of an outer ornamental web 1 to which is made fast a ring or crown 2 allowing the web 1 to be secured through clipping into the stepped portion (not shown) of a wheel rim (also not shown).

The crown or ring 2 may be secured to the web 1 in any suitable way.

It should preferably be integral with the web 1 and obtained through moulding therewith.

It may also consit of an independent element which is secured through adhesive bonding or rivetting onto the web 1 or which is removably made fast with this web through the agency of suitable clamps or like fasteners whatsoever for instance.

The ring-shaped portion 2 preferably comprises a base portion 3 made fast with the web 1 and connected to the ring-shaped portion through lugs or the like 4 likely to give said ring-shaped portion a radial elasticity.

The ring-shaped portion 2 comprises one or several discontinued or split parts such as 5. According to the examplary embodment shown on FIG. 2 the ring-shaped portion is discontinued or split at two locations positioned substantially along its diameter as is well seen.

Both free ends 5a defining the gap 5 are connected by a spring-like metal wire 6 hooked onto said free ends by any suitable means such for instance as through a simple opening.

According to the invention the mutually confronting ends 5a are connected or bridged by a strap 7 removably mounted between said ends in such a manner as to exert a prestress upon the ring-shaped portion 2 against the force exerted by the spring wire 6 tending to move the free ends 5a of the ring-shaped portion 2 away from each other.

According to an examplary embodiment the strap 7 comprises two upstanding lugs 8 made for instance through cut-out or stoved-in portions 9 in said strap.

These upstanding or depending lugs 8 may co-operate with holes 9 formed in both confronting free ends 5a, respectively, of the ring-shaped portion 2.

The strap 7 as well shown on FIG. 1 comprises two creased, flanged or turned-down opposite edges 10 giving it a U-shaped cross-section improving the rigidity or stiffness of said strap while allowing the ring-shaped portion 2 to be set or fitted thereinto.

For a better or easier understanding of the invention a description of how the ornamental wheel hub cap is used follows.

After manufacture and before mounting onto the wheel rim the ornamental hub cap is provided with its straps 7. This means that the upstanding or depending lugs 8 are inserted into the holes 9 of the ring 2 whereby the ends 5a of said ring are urged to move towards each other so as to generate a kind of prestress within the ring. It has thus been found that prior to the mounting of the web-cap 1 and ring 2 assembly onto the wheel rim the deformation of this assembly under the effect of the spring wire 6 is advantageously avoided, which deformation is likely to impair the aesthetic and clipping qualities of the ring 2.

To carry out the mounting of the ornamental hub cap onto the wheel rim, the diametrally opposite straps 7 are removed, whereby the ring is release and a slight radial deformation thereof is produced.

Then the ornamental hub cap may be mounted in a safe and reliable manner onto the wheel rim through the medium of the ring 2 which will have all the required qualities of radial elasticity.

It should be understood that the invention is not at all limited to the embodiment described and shown which has been given by way of example only.

Thus the number of discontinued portions or gaps in the ring hence of the prestressing straps may be any number whatsoever. Likewise the ring 2 may be made fast with the outer web 1 forming the ornamental hub cap through any suitable means.

Therefore the invention comprises all the technical equivalents of the means described as well as their combinations if these are carried out according to its gist and within the scope of the appended claims.

I claim:

1. An ornamental wheel hub cap adapted to be removably secured into a stepped portion of a wheel rim of a vehicle through the medium of a resiliently deformable ring clipped into said stepped portion and split to form at least two free ends connected by at least one resiliently deformable means for causing said ring to be radially deformed, said one resiliently deformable means comprising a wire, wherein the improvement comprises a strap being removably mounted between the at least two free ends and exerting a prestress upon the ring against a force exerted by said at least one resiliently deformable means thereby preventing the deformation of the hub cap-ring assembly before mounting onto the wheel rim and also allowing the mounting of this assembly through clipping onto the rim after removal of the strap.

2. Ornamental hub cap according to claim 1, wherein the strap comprises two upstanding lugs provided by being cut-out into the strap and co-operating with holes provided in the at least two free ends, respectively.

3. An ornamental hub cap according to claim 1, wherein said strap comprises two turned-down edges giving it a U-shaped cross-section allowing the ring to be set into the strap.

4. Ornamental hub cap according to claim 1, wherein the ring is split at two locations positioned substantially along its diameter and may therefore be provided with two straps.

* * * * *